I. S. KALLIS & J. BERG.
AUTOMOBILE TIRE TRUNK.
APPLICATION FILED OCT. 1, 1910.
990,745.
Patented Apr. 25, 1911.
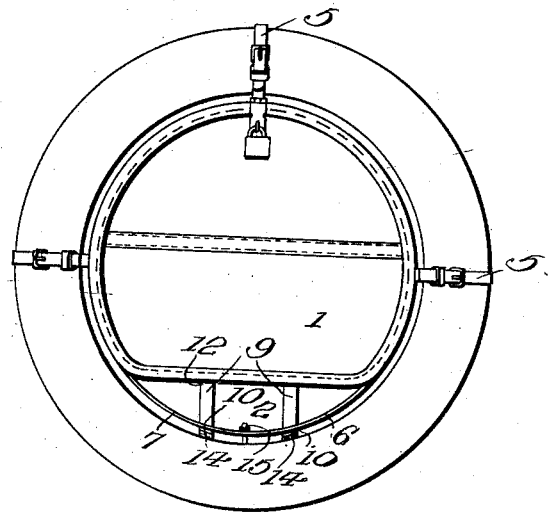
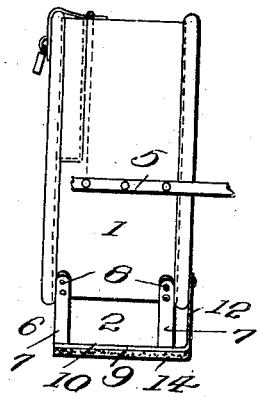
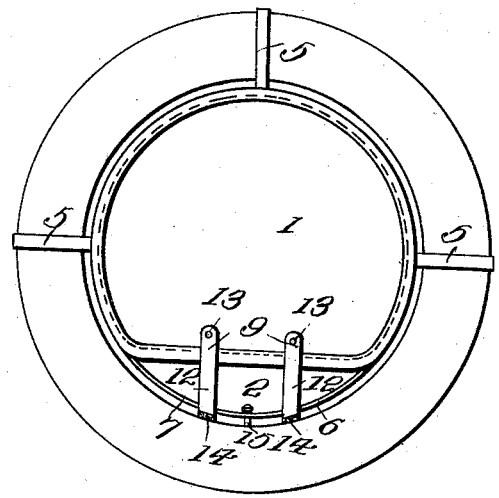
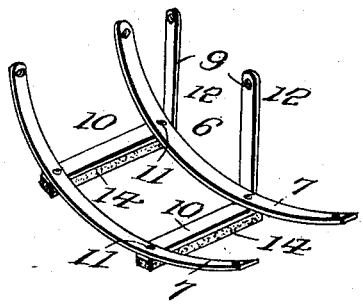
Witnesses
Inventors
I. S. Kallis.
J. Berg.
By Attorney

UNITED STATES PATENT OFFICE.

ISIDORE SIDNEY KALLIS, OF NEW YORK, AND JOSEPH BERG, OF BROOKLYN, NEW YORK.

AUTOMOBILE TIRE-TRUNK.

990,745.

Specification of Letters Patent.     Patented Apr. 25, 1911.

Application filed October 1, 1910. Serial No. 584,948.

*To all whom it may concern:*

Be it known that we, ISIDORE SIDNEY KALLIS, residing in New York, in the county and State of New York, and JOSEPH BERG, residing at Brooklyn, county of Kings, State of New York, citizens of the United States, have invented a new and useful Improvement in Automobile Tire-Trunks, of which the following is a specification.

This invention relates to supports for automobile trunks, when carried on extra tires.

The object of the invention is to provide means for preventing a trunk rubbing the tire, or contacting with the valve.

The invention also comprehends improvements in the specific details of construction and arrangement of parts, which will be hereinafter described and particularly pointed out in the claims.

In the drawings: Figure 1 is a side elevation of an automobile trunk and tire, illustrating the application of our invention. Fig. 2 is a similar view, but looking from the opposite side. Fig. 3 is a view of a trunk equipped with our invention. Fig. 4 is a detail perspective view of the trunk support.

The same numerals refer to like parts in all the figures.

1 indicates a circular automobile trunk, provided with a side door, having a flat bottom to form with a frame a recess 2. Attached to the periphery of the trunk are straps 5, by means of which said trunk is secured to a tire, in the usual manner.

A frame 6, is secured to the under peripherical surface of the trunk. This frame comprises two semi-circular strips 7, secured adjacent the edges of the trunk by fastenings 8. The two semi-circular strips 7, are connected by two L-shaped spaced apart strips 9, the horizontal portions 10 being secured to the strips 7, by fastenings 11 and the vertical portions 12, of said strips are secured to the rear surface of the trunk at 13. Secured to the under side of the horizontal portions 10, of the L-shaped strips, are cushions 14, which bear directly on the tire when the trunk is secured in position.

The frame 6, is permanently secured to the trunk by the fastenings 8 and 13, and by reason of the space between the strips 9, and the recess formed by the bottom of the trunk, a pocket is formed for the valve 15, of the tire.

When in use, the trunk is placed within the tire, the cushions 14, resting on the inner surface of said tire, and the strips 5, are buckled. When so positioned, it is obvious the cushions are the only points of contact with the tire, as the strips are so adjusted as to space the walls of the trunk from the inner tire surface.

By constructing the frame in the manner described, liability of injuring the tire is extremely remote, as the shock by jolting, incident to the movement of a car, will be absorbed by the cushions, and as the latter are of soft material, they will not wear the tire surface. Furthermore, the movement of the trunk will not injure the valve as it is so pocketed that it cannot contact with either the strips or the trunk walls.

What we claim is:

1. In combination, a trunk, a frame on the underside of the trunk, said frame comprising spaced apart side bars, said bars being bowed at their middle portion to form a space between said middle portion and the bottom of the trunk, the ends of the bowed bars being secured to the trunk, two spaced apart strips extending across the spaced apart bowed bars, said strips having upwardly extended members which engage the side of the trunk, the strips being secured to the spaced apart bars, the extended members being secured to the side of the trunk, and cushions on the bottom of the strips.

2. In combination, a trunk having circular side walls, an arcuate shape frame secured to the lower portion of the circular side walls of the trunk and forming a continuation of the outline of the curved walls, said frame having an opening and two upwardly extended members on one side, said members engaging the side of the trunk, and are secured thereto and two transverse cushions secured to the bottom of the frame adjacent the walls of the opening therein.

3. In combination, a trunk having a flat bottom a curved frame below the trunk, said frame comprising two parallel side bars, said side bars being secured to the trunk beyond the bottom thereof, two transverse L-shaped spaced apart strips, the horizontal portions of which extend across the two parallel side bars, and are secured thereto, the vertical portions of said L-shaped strips engaging one side of the trunk and are secured thereto, and cushions on the bottoms of the L-shaped strips.

4. In combination, a trunk having curved walls, an arcuate shape frame secured to the bottom of the trunk, said frame comprising curved side bars and transverse strips, said curved side bars forming a continuation of the outline of the trunk, the bars and strips being spaced apart to receive a valve on a tire when the trunk is supported on the latter, and a cushion secured to the underside of each of the transverse strips.

In testimony whereof we, ISIDORE SIDNEY KALLIS and JOSEPH BERG have signed our names to this specification in the presence of two subscribing witnesses, this 29th day of September 1910.

ISIDORE SIDNEY KALLIS.
JOSEPH BERG.

Witnesses:
JOHN W. SANFORD,
P. L. ARKIN.

Copies of this patent may be obtained for five cents each, by addressing the "Commissioner of Patents, Washington, D. C."